Oct. 22, 1929.  W. S. MUMFORD  1,732,907
SPIN POT, DRIVING MECHANISM, AND MOTOR CASING THEREFOR
Filed April 8, 1929  3 Sheets-Sheet 1
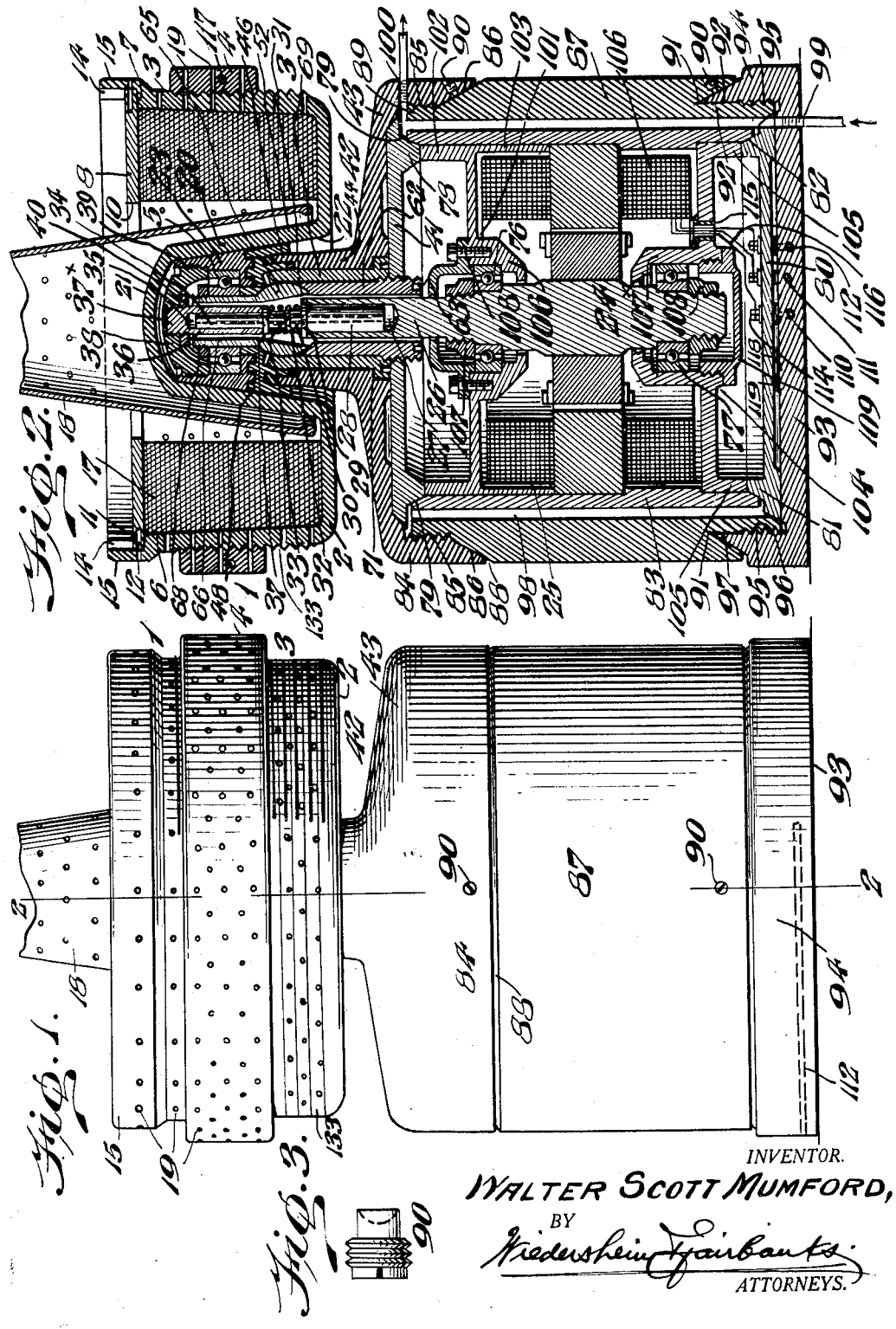
INVENTOR.
WALTER SCOTT MUMFORD,
BY
ATTORNEYS.

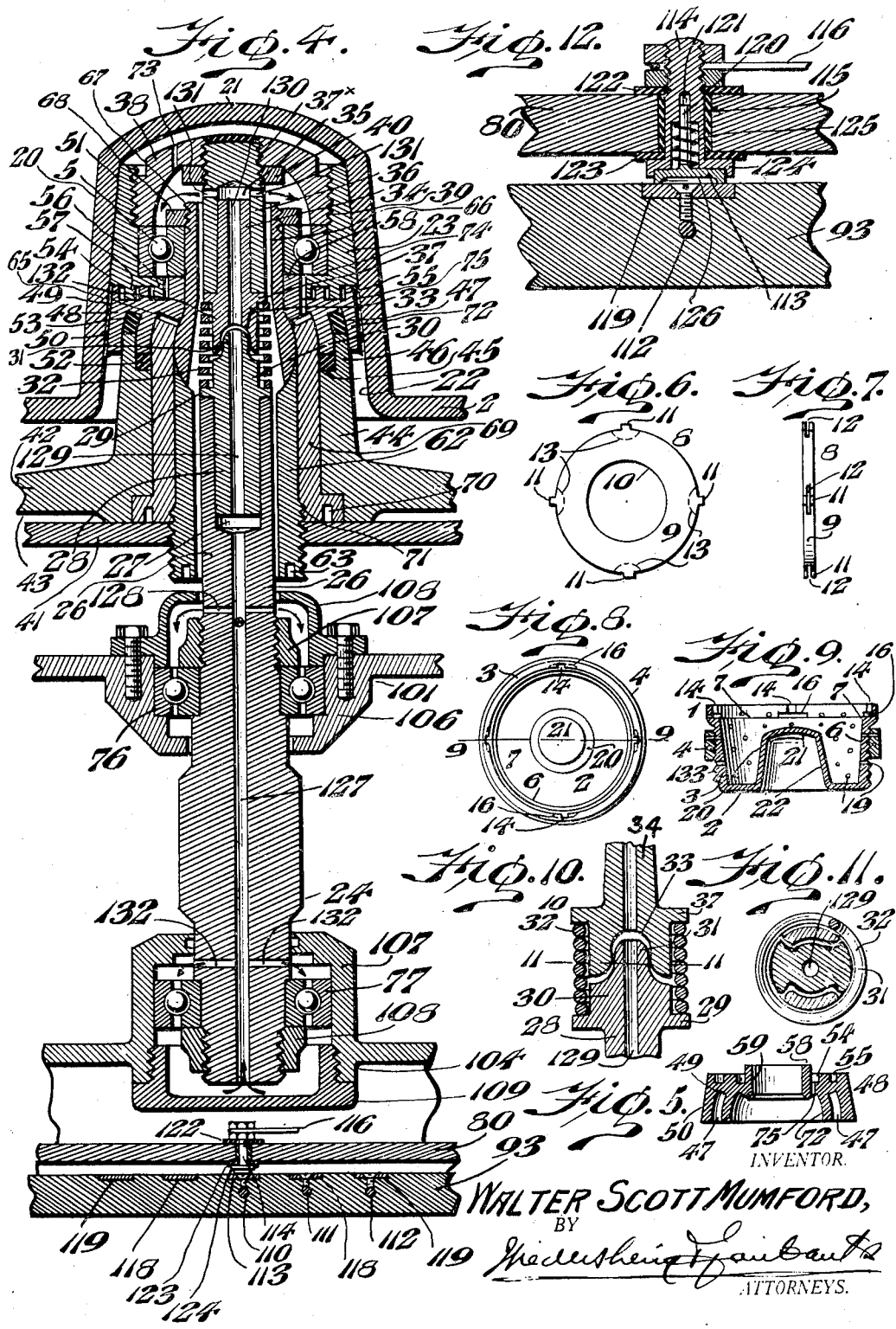

Oct. 22, 1929.  W. S. MUMFORD  1,732,907
SPIN POT, DRIVING MECHANISM, AND MOTOR CASING THEREFOR
Filed April 8, 1929   3 Sheets-Sheet 3
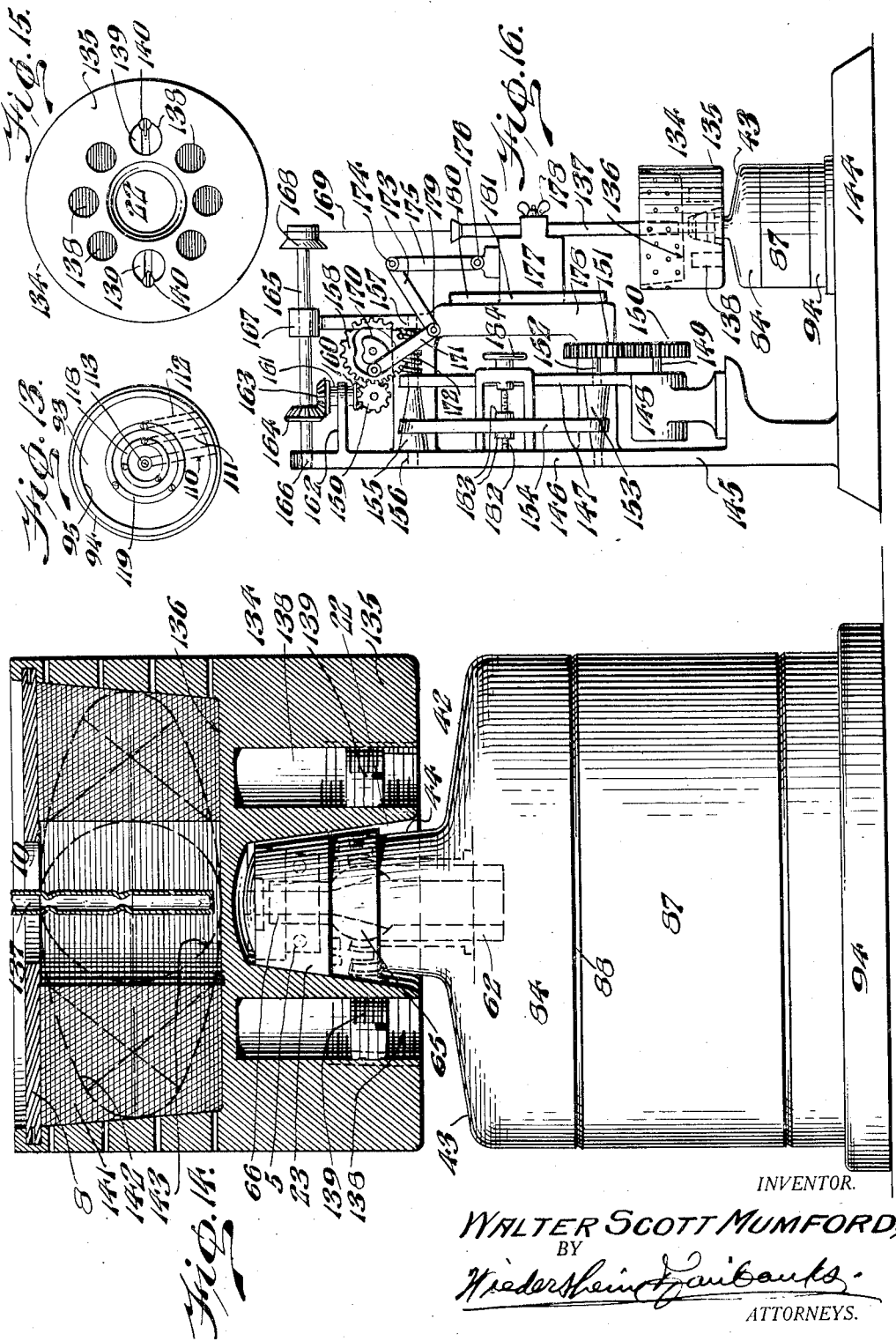
INVENTOR.
WALTER SCOTT MUMFORD,
BY
ATTORNEYS.

Patented Oct. 22, 1929

1,732,907

UNITED STATES PATENT OFFICE

WALTER SCOTT MUMFORD, OF PHILADELPHIA, PENNSYLVANIA

SPIN POT, DRIVING MECHANISM, AND MOTOR CASING THEREFOR

Application filed April 8, 1929. Serial No. 353,449.

The operation of spin pots of the conventional type for the manufacture of artificial silks and similar processes has heretofore been inefficient and uneconomical due to the undue virbration and unbalancing of such spin pots during acceleration and revolution at maximum speed, which is due to inherent or resultant unbalancing of the spin pot and its adjunct as well as to extraneous unbalancing and disturbing forces to which a revolving spin pot of this character is ordinarily subjected. This vibration of the spin pot results in various disadvantages, among which are a rapid deterioration of parts, excessive power consumption, reduction of the speed limit or maximum R. P. M. attainable, and a non-uniform twisting of the yarn produced, which is commonly known in the trade as striation.

The object of my invention is to produce a spin pot which is free from vibration and which may be revolved at maximum speed, producing at the same time a uniformly twisted yarn at minimum cost of operation and maintenance.

My invention further consists in a novel spin pot having a central, conical, inverted cup-shaped formation, whereby said spin pot may be instantly operatively centered and positioned upon the drive head carried by the flexible driving shaft, the spherical bearing and their adjuncts.

My invention further consists in providing a conical or tapering drive head which is frictionally held in the uppermost portion of said inverted conical cup formation and which is rigidly connected to a flexible driving shaft, said drive head being if an external shape or contour to correspond with and conform to the internal contiguous surface of said inverted conical cup-shaped formation in the body of said spin pot, whereby the latter is afforded a maximum frictional seating contact to prevent the vibration or wabbling of said spin pot with respect to said shaft.

My invention further consists of a spin pot, whose base is re-entrant or provided with an inverted conical cup-shaped formation, in which the actuating shaft and supporting bearings are positioned, whereby the center of gravity is lowered and the overall height of the assembled spin pot and its adjuncts is greatly reduced.

My invention further consists of a spin pot composed of or covered with acid resisting material such as bakelite and similar substances, to guard against wear and corrosion otherwise resulting from the necessary exposure of metallic spin pots to the action of acids and other corrosive compounds ordinarily employed in industrial processes.

My invention further consists in a novel sealing construction for the driving shaft and bearings and their adjuncts to prevent the corrosive gases from attacking the metallic parts composing the internal structure of the bearings.

My invention further consists in a novel construction of driving mechanism, whereby I am enabled to employ one standard spin pot supporting and driving mechanism upon which spin pots of different sizes may be detachably supported without alteration of the driving or balancing systems or mechanisms, said spin pot being in frictional engagement with the upper end of the drive head and its bearing.

It further consists in a novel construction of spin pot cover, which can be instantly installed in the spin pot or removed therefrom.

It further consists of a novel construction of upper and lower drive shaft shanks, a coupling or flexible coupling spring common thereto, and novel connections from said upper shank to the drive head.

It further consists in a novel construction of funnel or other shaped servel positioned in a manner with respect to the spin pot, and adapted to the novel shape of spin pot, embodying my invention.

To the above ends, my invention consists in a novel spin pot having a central or pendant annular balancing mass, a drive head actuated by a flexible driving shaft for revolving said spin pot, an upper ball bearing in horizontal alignment with said balancing mass, a spherical bearing and a stationary support, having a socket for receiving said spherical bearing to produce a universal joint, said spherical bearing being positioned below said balancing mass to permit of temporary limited gyration of the spin pot under the effect of disturbing or unbalancing conditions to which said spin pot may be subjected during operation, and to prevent detrimental vibration, when the pot is in use in combination with a novel sealing member interposed between said drive head and the outer stationary support.

It further consists in a novel manner of encasing and sealing the motor, driving mechanism, and all movable parts, so that no acids or fumes can have access thereto, and in a novel manner of assembling the motor casing and providing for the cooling of the motor.

It further consists of a novel spin pot having an adjustable or pendant balancing mass, and a novel manner and method of correlating and coordinating the R. P. M. of the Godet wheel and spin pot with the oscillations per minute of the servel, whereby what is termed balloon silk is formed which dispenses with two washing operations heretofore employed.

It further consists of the novel features of construction and advantage hereinafter described and claimed.

For the purpose of illustrating my invention, I have shown in the accompanying drawings forms thereof which are at present preferred by me, since the same have been found in practice to give satisfactory and reliable results, although it is to be understood that the various instrumentalities of which my invention consists can be variously arranged and organized, and that my invention is not limited to the precise arrangement and organization of the instrumentalities as herein shown and described.

Fig. 1, represents a side elevation of a novel spin pot, its driving mechanism, and the casing therefor, embodying my invention.

Fig. 2, represents a vertical section on line 2—2 of Fig. 1.

Fig. 3, represents a side elevation of a locking screw employed in detached position.

Fig. 4, represents on an enlarged scale a vertical sectional view of a portion of the spin pot and its driving balancing and lubricating mechanisms.

Fig. 5, represents on a reduced scale a vertical sectional view of the sealing member detached.

Fig. 6, represents a plan view of the spin pot cover detached.

Fig. 7, represents an end elevation of Fig. 6.

Fig. 8, represents a plan view of the spin pot with the cover removed.

Fig. 9, represents a vertical sectional view of the spin pot with the cover and silk cake removed, the section being taken on line 9—9 of Fig. 8.

Fig. 10, represents a vertical section of the upper and lower drive shaft shanks detached and the coupling spring common thereto.

Fig. 11, represents a section on line 11—11 of Fig. 10.

Fig. 12, represents on an enlarged scale a sectional view of the electrical connections seen at the bottom of Fig. 4.

Fig. 13, represents a plan view of certain of the conductors seen at the bottom of Figs. 2 and 4.

Fig. 14, represents a vertical sectional view of a spin pot embodying my invention having a pendant balancing mass, the drive head and motor casing being shown in elevation.

Fig. 15, represents on a reduced scale, a bottom plan view of the spin pot seen in Fig. 14.

Fig. 16, represents a diagrammatic view in side elevation, showing a preferred assembly for providing balloon silk.

Referring to the drawings:

1 designates my novel construction of spin pot, the same comprising the horizontal base 2, the outer substantially vertical wall 3, and the intermediate annular bead or annular balancing mass 4, which is located in horizontal alignment with the upper ball bearing 5 hereinafter referred to in greater detail. The inner wall 6 of the spin pot diverges upwardly, as will be understood from Figs. 2 and 9, and near its upper portion I form the annular ledge or shoulder 7 upon which rests the spin pot cover 8 comprising the body 9, having the central opening 10. 11 designates lugs formed integral with the cover, four being shown in the present instance diametrically arranged, and each lug is sawed horizontally as indicated at 12 in Fig. 7, the cut or kerf extending into the cover body as indicated at 13 in dotted lines in Fig. 6, whereby upper and lower resilient lugs are formed which can be deflected towards each other when the cover is assembled on the spin pot. Referring now to Figs. 8 and 9, 14 designates vertical recesses in the upper wall 15 of the spin pot, which align with the lugs 11 of said cover, said recesses being slightly larger than said lugs, so as to enable the latter to drop readily therein. The recesses 14 terminate in the horizontal slots 16, whose contour and extent will be understood from Figs. 8 and 9. The depth of the slots 16 is slightly less than the thickness of the split lugs 11, so that when the cover 8 is dropped into the assembled position seen in Fig. 2 and pressed slightly downward, the lower lugs 11 will yield slightly and the cover upon being turned in either direction will be efficiently locked in position by the frictional contact of the lugs 11 with the top and bottom walls of the slots 16. By this construction a very efficient lock is provided for retaining the spin pot cover in position, which effectively retains the silk cake 17 in position. The cover 8 is readily removed by rotating it until the lugs 11 align with the recesses 14, in which position the cover can be readily raised and the silk cake 17 removed. The central opening 10 in the cover 8 permits the conical or funnel or other shaped servel 18 to assume its proper position, with relation to the spin pot, and also permits the insertion of the operator's finger to grasp the cover when it is desired to remove or replace it. The servel 18 may be of funnel shape, as seen in Fig. 2, or of tubular shape as seen in Figs. 14 and 16, and may be made of glass or other vitreous or other material. The ports 19 provide for the exit of the acid from the silk cake 17 and spin pot during the rotation of the latter. As it is desirable in these devices to keep the overall height of the spin pot and its adjuncts at a minimum and to keep the center of gravity of the spin pot as low as possible on account of the high speed at which the spin pot must be revolved, I construct the central bottom portion of the spin pot in the form of an inverted conical cup comprising the conical or upwardly converging portion 20 and the convex or dome shaped portion 21, as will be understood from Figs. 2, 4, and 9. This conical inverted cup-shaped base portion designated as 20 and 21 extends upwardly to a point preferably at about the mid height of the spin pot, and its inner periphery 22 forms an elongated conical bearing whereby an efficient frictional contact is had with the drive head 23, best seen in Figs. 2 and 4. The drive head 23 and its adjuncts can be rotated by any suitable means or from any source of power, but I have found in practice that the best results are attained by the assembly and mechanisms seen in Figs. 2 and 4, wherein 24 designates the vertically disposed motor shaft of a conventional electric motor 25, whose upper portion 26 is of reduced diameter and provided with a tapered seat or socket 27 which receives the lower drive shaft shank 28 which has the flange 29 adapted to rest upon the top of the motor shaft. Referring to Fig. 4, 30 designates an extension projecting above the flange 29, terminating in the tongue 31, which is interlocked with the groove 33 in the end of the upper drive shaft shank 34, which is seated in the taper socket 35 of the drive head shaft 36, having the lower flange 37, between which latter and the flange 29 is the coil spring 32, which may be square as seen in Fig. 4, or round as seen in Fig. 10. The drive head shaft 36 is threaded at its upper end 37*, and screwed into the drive head cap 38, which is in threaded engagement at 39 with the drive head 23. The lock nut 40 locks the members 37* and 38 in assembled position, so that the parts 26, 28, 32, 34, 37, 38, 40, and 23 tend to rotate as a unit. Still referring to Figs. 2 and 4, it will be seen that the upper metallic plate or disc 41, which serves as the motor chamber cover, also carries the lower seal and the motor cover 42 composed of the inclined top wall 43 and the upward extension or neck 44 terminating in the inner annular shoulder 45, and the outer upwardly extending annular flange 46, which latter is slightly curved and adapted to enter the similarly shaped bottom groove or seat 47 in the lower portion of the seal 48, best seen in Figs. 4 and 5. The seal 48 has a slight clearance from the wall 22, as seen in Fig. 1, and does not rotate and is composed of the body portion 49, having the outer conical or upwardly converging periphery or wall 50, which has the same incline as the seat 22 of the spin pot, so that the wall 50 of said seal forms a continuity of the wall 51 of the drive head 23, when the parts are assembled as seen in Figs. 2 and 4. 52 designates a lower annular gasket supported on the shoulder 45, and 53 designates an upper gasket interposed between the top of the flange 46 and the top of the seat 47, as best seen in Fig. 4. 54 and 55 designate inner and outer upper concentric grooves at the top of the body 49, which receive the pendant, annular, inner, and outer tongues 56 and 57 respectively at the bottom of the drive head 23, when the parts are assembled, as seen in Figs. 2 and 4. The top 58 of the central hollow tubular extension 59 is flush with the inner horizontal wall 60 and said walls 58 and 60 serve to support the upper ball bearing 5. The motor chamber cover 41 has the lower sleeve seat 62 in threaded engagement therewith, said sleeve seat being provided with the bottom holes 63, for the application of a spanner wrench thereto, and at the top of said sleeve seat is the concave bearing 64, which receives the ball member 65 of the ball seated gyro-spindle 66, which is hollow, as will be understood from Fig. 4, so as to clear the enclosed parts and is threaded at its upper portion 67 to receive the lock nut 68, which engages the top of the ball bearing 5. The outer or upper sleeve seat 69 encloses the lower sleeve seat 62 and is screwed thereupon at 71 by the application of a spanner wrench to the holes 70, and the upper outer portion of said sleeve seat is curved to fit the contiguous inner wall 72 of the seal 48, while the upper inner curved portion thereof forms a bearing for the central and upper portions of the ball member 65, the spindle portion 66 of the latter passing through the bore or tubular extension 59 of the stationary seal 48. The lubricant ports 73, 74, and 75 seen in Fig. 4 enable all the moving parts to be effectively lubricated. The motor shaft 24 is provided with lower and upper ball bearings 77 and 76 as seen at the lower portion of Figs. 2 and 4, which are effectively enclosed by the housings seen therein. The enclosing of the motor and providing for the cooling thereof in these devices is a matter of great importance and in Fig. 2, I have shown one preferred form of apparatus for this purpose. The top cover plate 41, heretofore referred to, is provided with a pendant annular wall 78, bevelled or chamfered as at 79. The bottom plate 80 also has an annular upwardly extending wall 81 bevelled as at 82. The outer cylinder 83 has its upper and lower inner portions bevelled to conform to the contiguous bevels of the walls 78 and 81. The seal and motor cover 43 has the pendant flange 84 internally threaded at 85, and provided with the bevelled portion 86. The outer casing 87 has an elongated upper bevelled wall 88, which merges upwardly into the externally threaded wall 89. Upon screwing the upper threaded portions 85 and 89 together, a tight joint will be formed between all the contiguous inclined surfaces as the points 79, 86, and 91 and the parts are locked from disengagement by one or more screws 90, preferably of the construction seen in Fig. 3. The lower end of the outer casing 87 has a V-shaped recess therein formed by the inclined wall 91 and the wall 92. The bottom closure 93 has an upwardly extending flange or wall 94, and interiorly threaded portion 95, engaging the exteriorly threaded portion 96, and a wedge shaped upper extension 97. When the parts are assembled as seen in Fig. 2, the engagement of the threaded portions will pull concentrically all the contiguous inclined surfaces closely into contact and form a tight upper and lower seal or joint, which will prevent any acid or fumes or deleterious gases from reaching the enclosed motor or any of the moving parts. It will be apparent that in the assembly of the casing sections, seen in Fig. 2, the tightening of the threaded members automatically draws all inclined surfaces of the stator and rotor parts together concentrically to the rotor and stator axis. 98 designates an annular and concentric air chamber between the members 83 and 87, through which air is permitted to flow from the bottom port or ports 99 to the upper port or ports 100, it being apparent that if desired, an inlet and exhaust pipe may be connected to said ports 99 and 100, and air under pressure may be admitted at the point 99 if desired.

To facilitate the assembly of the motor encasing elements and their adjuncts, I provide the upper member 101, seen in Fig. 2, comprising the horizontal web and the outer upwardly and downwardly extending annular flanges 102 and 103, said upper flange serving to support and abut against the annular pendant wall 78. 104 designates the lower end member having the pendant annular flange 105, which rests upon or contacts with the contiguous annular flange 81. The upper ball bearing 76 is contained within the pendant housing 106 and is retained in position by the nut 107, which is within the cover 108. The lower ball bearing 77 is retained within the housing 107$^x$ by the lower nut 108, which is enclosed by the bottom cap 109. 110, 111, and 112 designate cables seated in the lower closure or cap 93, each cable having a contact 113, as seen in Fig. 12, which has a stem 120 slidable in the seat 121 of the binding post 114, which passes through the insulating sleeve 115, and is connected to a conductor as 116. The other two conductors seen at the lower right hand portion of Fig. 2 are similarly connected up, as will be understood from Fig. 12, wherein I also employ upper and lower insulating washers 122 and 123. The lower portion of the binding post is cup shaped as at 124 to receive the disk like foot of the contact 113. The spring 125 encircles the stem 120 and exerts tension downwardly upon the contact 113 which is hollowed out at 126 so that said contact is always under tension and in contact with the contiguous ring or conductor.

As these spin pots, their drive heads, and their adjuncts revolve at a high speed, it is essential that provision be made for thorough lubrication; and in Fig. 4 I have shown provision for lubrication through the medium of the ports 73, 74, and 75.

127 designates a lubricant passage through the motor shaft 24 communicating with ports 128, whereby the lubricant can be forced upon the ball bearings 76. The lubricant flows from the passage 127 into the chamber 27 and thence into the passage 129 and thence through the passage 130 and the ports 131 upon the upper ball bearing 5, a continuous passage being formed between the conduits 129 and 130.

It will be seen from the foregoing that when the bottom closure, movable cap, or grease cup 109 is removed, the grease, oil, or other lubricant can be forced into the passage 127 by a grease gun of any suitable character after which the cap 109 is replaced and as it is screwed upwardly, the lubricant will be forced through the ports 128 and 131 upon the upper and intermediate ball bearings 5 and 76. Through the lower ports 132 the lubricant will be forced to the lower ball bearing 77, as will be seen from Fig. 12. I have omitted the lubricant passage 127 from Fig. 2 for the sake of clearness of illustration, as the same is clearly shown in Fig. 4. In case it is desired to slightly adjust the position of the balancing mass 4 for any reason I provide the annular mass or ring 4 with internal screw threads, in threaded engagement with the outer threaded wall 133, so that the element 4 may be rotated up or down according to requirements, and then locked by any suitable means in the desired position. In Figs. 14 to 16, I have shown the spin pot 134 as provided with a pendant annular balancing mass 135, whose center of gravity is coincident with the center of the ball bearings 5, said pot having the rectilinear, horizontal, or uninterrupted base 136, and the centrally disposed servel 137. The pendant, annular, balancing mass 135 is provided with the passages 138 open at the bottom, which may be of any desired number and if desired some of said passages may be provided with adjustable weights 139 screwed into the lower ends thereof and locked by any suitable means as 140 to control position of the center of gravity. At the bottom central portion of the balancing mass 135 is the tapered or conical slot 22, having a taper of 7°, 44″, which frictionally engages the drive head 23, these parts having the same construction and function as already described, and the driving mechanism and its adjuncts being the same as seen in Figs. 2 or 4. 141 designates the silk cake and the dotted ellipses 142 and 143 represent diagrammatically some of the positions assumed by the artificial silk filament in the formation of "balloon" silk or in the "ballooning" of the silk, as it is variously termed, next to be referred to. The formation or creation of "balloon" silk is impossible unless the spin pot is accurately and perfectly balanced at all times as in my present invention, and it further requires a certain coordination or correlation between the three active elements handling the filament, as the Godet wheel, the servel operating mechanism, and the spin pot and its driving mechanism. In Fig. 16, I have shown a preferred assembly or unit for producing balloon silk, wherein the bed 144 supports the spin pot 134 and its motor casing 87 and the housing 145, composed of the uprights 146 and 147. The electric motor 148 drives the shaft 149 and the gear 150 thereon, which is in mesh with the gear 151 on the shaft 152, which carries the lower cone pulley 153, which drives the belt 154, which drives the upper cone pulley 155. The upper cone pulley is mounted on the shaft 156, which revolves on bearings at the upper portion of the uprights 146 and 147, and said shaft 156 has formed thereon the worm 157 which meshes with and drives the worm gear 158, which drives the pinion 159, which meshes with the gear 160 mounted on the shaft 161, having its bearing in the arm 162. The shaft 161 carries the bevel gear 163 in mesh with the bevel gear 164 on the shaft 165 revolving in the bearings 166 and 167, said shaft 165 carrying the Godet wheel 168, over which the filament of artificial silk 169 passes into the servel 137. On the face of the gear 158 is formed the heart-shaped cam 170, which engages a roller carried by the upper end of the arm 171 of the bell crank lever 172 having the arm 173, which is pivoted at 174 to the link 175, which is pivoted at 176 to the weighted head 177 to which the servel 137 is adjustably secured by a wing nut or the like 178. The upright 146 has a bracket 178 cast thereon on which the bell crank 172 is fulcrumed at 179. The bracket 178 has also formed on the right thereof, vertical ways 180, which receive and guide the juxtaposed tongue 181 of the head 177 so that the latter and the servel reciprocate at all times in a vertical plane, and by reason of the heart-shaped cam the movements of the servel are at all times regular and uniform, which is desirable and imperative in order to produce perfect silk. The coaction between the tongue 181 and the ways 180 is only shown diagrammatically, but will be clear to those skilled in the art. 182 designates the threaded stem of a conventional form of belt shifter for operating the belt engaging elements 183, said stem being rotated by the hand wheel 184. In the construction seen in Fig. 16, the Godet wheel 168 of 5″ diameter is designed to run 130 R. P. M., the spin pot 134—5600 R. P. M., and the servel to make 22 oscillations per minute, under which conditions the silk will "balloon" or assume the positions seen in dotted lines, 142 and 143, in Fig. 14, during the formation of the silk cake 141, as the servel assumes its upper and lower and intermediate positions. If the speed of the servel is not maintained at 22 oscillations per minute and the above mentioned speed of the Godet wheel and spin pot deviated from, the silk will whip about in the spin pot and tend to wind about the servel, thereby producing an inferior grade of silk. The advantageous results from spinning artificial silk under exactly the foregoing conditions are that as the silk during spinning assumes the "balloon" contours seen in Fig. 14, the moisture or acid seems to be extracted therefrom to a maximum extent in a minimum space of time, so that two of the subsequent washings can be dispensed with, thereby greatly decreasing the cost of manufacture, since the spiral "ballooning" of the silk between the servel and wall of the spin pot permits the centrifugal force to act transversely to the axis of the filament of artificial silk. If the speed of the Godet wheel is excessive so that the velocity of the filament of silk between the servel and spin pot wall is too great, the filament will assume a position which is almost a radial rectilinear line between the end of the servel and the pot wall, which does not permit centrifugal force to act transversely to the filament. By my invention I provide means, as stated, to created a spiral, elliptical loop at all times which is presented to centrifugal forces so that the latter act transversely to the axis of the filament as it is being twisted during its travel to the inner wall of the spin pot.

It will be understood in practice that the spin pot seen in Figures 1, 2, 4, 9, 14, 15 and 16 is preferably made of bakelite. The drive head 23 and the seal 48 are also preferably made of bakelite as are the parts 44, 87, 84 and 94, so that when all the elements are assembled as seen in Figures 1, 2 and 14 it will be apparent that all the metallic elements such as the motor spindle 24 and its adjuncts are effectively sealed against the ingress of the acids and deleterious fumes which are created in the manufacture of artificial silk. The motor casing best seen in Figures 1 and 2 and Figure 14 which is preferably made of bakelite permits the arranging of the assembled parts so that they will be sustained concentric with the vertical axes of the rotor and stator parts in such a manner that the possibilities of eccentricities due to assembly are eliminated, which occur when bolts are employed.

By my novel construction of motor casing whereby I eliminate all bolts and nuts and retain the various elements hermetically sealed, all liability of ingress of deleterious acids and gases is prevented, and in addition I provide a concentric air space 98 as seen in Figure 2 which insulates, by non-convection, the heat radiated by the motor casing, and I further provide ports 99 and 100 for the ingress of cool and egress of the heated air.

My novel casing is best seen in Figure 2 and comprises the two male and two female threaded parts which are drawn together concentrically by means of threads 85 and 95, the threaded engagement as shown and the surfaces 86, 88, 91 and 92 form tight joints which effectively seal the motor from all exterior liquids and gases, the assembled parts being held firmly in juxtaposition by set screws 90 as will be understood from Figure 1.

The operation is as follows:—

The rotation of the motor spindle 24 is imparted to the elements 28 and 36 and thence to the drive head 23 through the medium of the tongue and groove connections 31 and 33. The sealing member 48, best seen in Figures 4 and 10 is stationary and effectively serves to prevent the ingress of acids and fumes, as is evident. In practice any tendency of the spin pot to wabble is effectively prevented by reason of the ball and socket connections seen in Figs. 2 and 4, and in practice the spin pot if having a tendency to wabble for a few seconds will instantly right itself and revolve without a particle of wabbling or undue vibration. The centers of the balls 5 being coincident with the centre of gravity of the spin pot in both of the constructions seen in Figures 2, 4 and 14, results in an effective and practical construction which causes the spin pot immediately and automatically to balance itself under all conditions of use.

The angle between the drive head 23 and contiguous portion of the conical seat of the spin pot in all of the constructions shown is preferably 7 degrees and forty four minutes, and has been carefully calculated so that the spin pot cannot in use be dislodged from the conical drive head.

The parts are effectively lubricated by the construction seen in Fig. 14, wherefrom it will be apparent that the closure 109 acts as a grease cup and that upon filling the same with grease and manually adjusting it the grease will be forced through the central passage 127 and the passages 129 and 130, and through the side ports to the ball bearings 5, 76 and 77 in an expeditious and effective manner. I have omitted the lubricating ports from Fig. 2 for the sake of clearness of illustration, but it will be understood that in Fig. 2, the same lubricating system is employed that is shown in Fig. 4.

The spring 32, best seen in Figs. 4 and 10 serves to permit a slight amount of flexibility to the parts 30 and 34 and in addition assists in maintaining said elements in proper vertical alignment.

I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having thus described my invention what I claim is new and desire to secure by Letters Patent, is:—

1. A spin pot having an annular side wall provided with drain ports and a bottom wall, a drive head therefor, and an annular pendant balancing mass depending below said bottom wall and having its center of gravity coincident with the horizontal axis of said drive head.

2. A spin pot having an annular side wall provided with drain ports and a bottom wall, a drive head therefor, and an annular pendant balancing mass depending below said bottom wall and having its center of gravity coincident with the horizontal axis of said drive head, said balancing mass having chambers therein open at their bottoms.

3. A spin pot having an annular side wall provided with drain ports and a bottom wall, and an annular pendant balancing mass depending below said bottom wall, said mass having chambers therein, and adjustable weighting devices in said chambers.

4. A spin pot having an annular side wall provided with drain ports and a rectilinear bottom wall, and an annular pendant balancing mass depending below said bottom wall and forming a continuation of said annular wall and having a central conical seat therein.

5. The combination of a spin pot having a central conical concavity in the bottom thereof, an outer pendant, annular balancing mass enclosing said concavity, driving means positioned in said conical concavity and an upper ball bearing for said driving means coincident with the center of gravity of said pendant balancing mass.

6. A spin pot having an annular side wall, a rectilinear bottom wall and a conical seat in the bottom thereof, an annular pendant balancing mass forming a continuation of said side wall surrounding said seat, and extending below the latter, a drive head engaging said seat, a motor spindle for driving said head, and mechanism intermediate said spindle and drive head for permitting the rotatable mass center automatically to adjust itself independently of said spindle.

7. The combination of a spin pot having a conical seat in the bottom thereof, a motor, a driving spindle therefor, a conical drive head engaging said conical seat and actuated by said spindle, an outer motor casing completely enclosing said motor, and composed of upper, intermediate and lower members and a seal positioned within said conical seat intermediate said upper casing member and said drive head, said casing members and seal being of material impervious to acids and gases.

8. The combination of a spin pot having a conical seat in the bottom thereof, a motor, a driving spindle therefor, a conical drive head engaging said conical seat and actuated by said spindle, an outer motor casing completely enclosing said motor, and composed of upper intermediate and lower members and a stationary seal positioned within said conical seat intermediate said upper casing member and said drive head, said casing members and seal being of material impervious to acids and gases, and there being an annular air chamber formed within said casing having upper and lower ports.

9. The combination of a spin pot having a conical seat in the bottom thereof, a motor, a driving spindle therefor, a conical drive head engaging said conical seat and actuated by said spindle, an outer motor casing completely enclosing said motor, without the use of conventional bolts composed of upper, intermediate and lower members and a stationary seal positioned within said conical seat intermediate said upper casing member and said drive head, said casing members and seal being of material impervious to acids and gases, there being male and female threads and inclined annular joints common to said intermediate and upper and lower casing members.

10. The combination of a bakelite spin pot, a conical seat therefor, a motor, a motor spindle, a drive head actuated by said spindle and seated in said conical seat, an upper bakelite casing section for said motor projecting within said conical seat, a stationary bakelite seal positioned in said conical seat intermediate said upper section and drive head, an intermediate bakelite section inclosing said motor, and a lower bakelite section inclosing the bottom of said motor, said upper, intermediate and lower sections being in threaded engagement and provided with annular downwardly inclined joints which concentrically position said sections.

11. The combination of a bakelite spin pot, a conical seat therefor, a motor, a motor spindle, a drive head actuated by said spindle and seated in said conical seat, an upper bakelite casing section for said motor projecting within said conical seat, a stationary bakelite seal positioned in said conical seat intermediate said upper section and drive head, an intermediate bakelite section inclosing said motor, and a lower bakelite section inclosing the bottom of said motor, said upper, intermediate and lower sections being in threaded engagement and provided with annular downwardly inclined joints which concentrically position said sections, and an annular air passage formed within said motor casing sections for cooling said motor.

12. The combination of a spin pot having vertical and horizontal groves in its upper inner wall, and a spin pot cover having split tongues adapted to be dropped into said vertical grooves and then to be rotated into and interlocked with said horizontal grooves against rotation.

13. The combination of a spin pot, a driving spindle therefor, a drive head engaging said spin pot, a flexible tongue and groove joint connection intermediate said driving spindle and drive head, upper and lower flanges on said joint connection, and a spring enclosing said flexible joint, and positioned between said flanges.

14. In a device of the character stated, a rotatable element comprising a spin pot having an outer wall, and an annular pendant balancing mass depending from said outer wall, driving means therefor, and mechanism intermediate said rotatable element and said driving means permitting the rotatable mass center automatically to adjust itself independently of said driving means.

15. The combination of a spin pot having an annular side wall, a bottom wall and a conical seat in the bottom thereof, an annular pendant balancing mass forming a continuation of said side wall surrounding said seat and extending below the latter, a drive head engaging said seat, a motor spindle for actuating said drive head and an upper ball bearing for said drive head coincident with the center of gravity of said annular pendant balancing mass.

16. The combination of a spin pot having an annular side wall, a bottom wall and a conical seat in the bottom thereof, an annular pendant balancing mass forming a continuation of said side wall surrounding said seat and extending below the latter, a drive head engaging said seat, a motor spindle for actuating said drive head, an upper ball bearing for said drive head whose normal horizontal plane is coincident with the center of gravity of said pendant balancing mass, a casing impervious to gas and acids surrounding the upper portion of said spindle and having its upper end positioned within said conical seat, and a stationary seal intermediate said drive head and its ball bearing and said casing, said seal being also located within said conical seat.

17. The combination of a spin pot, having an annular side wall and a bottom wall, an annular pendant balancing mass forming a continuation of said side wall and depending below said bottom wall, a driving head engaging said bottom wall, a driving spindle having a flexible joint therein, and its upper portion engaging said driving head, an upper ball bearing positioned in said driving head, a spherical member surrounding said flexible joint and having an upper extension engaging said upper ball bearing, concave seats for said spherical head, a stationary outer casing enclosing said concave seats, and a stationary seal intermediate said outer casing and driving head.

18. The combination of a spin pot, having an outer wall, and a pendant annular balancing mass forming a continuation of said outer wall, a driving head engaging the bottom of said spin pot, a driving spindle having a flexible tongue and groove joint therein with its upper portion engaging said driving head, a coil spring surrounding said flexible joint, an upper ball bearing positioned in said driving head, and having its normal horizontal plane coincident with the center of gravity of said pendant annular balancing mass, a spherical head surrounding said flexible joint and having an upper extension engaging said ball bearing, concave seats for said spherical head, a stationary support for said concave seats, an outer casing and a stationary seal intermediate the upper portion of said casing and the bottom of said driving head.

19. The combination of a spin pot, a driving spindle therefor, a drive head engaging said spin pot, a flexible tongue and groove joint connection intermediate said driving spindle and drive head, a spring encasing said flexible joint connection, upper and lower flanges for said joint connection for retaining said spring in position, a spherical member surrounding said flexible joint, a ball bearing for said drive head, an upper extension from said spherical member engaging said ball bearing, and concaved seats for said spherical head.

20. The combination of a spin pot, a driving spindle therefor, a drive head engaging said spin pot, a flexible tongue and groove joint connection intermediate said driving spindle and drive head, a spring encasing said flexible joint connection, upper and lower flanges for said joint connection for retaining said spring in position, a spherical member surrounding said flexible joint, a ball bearing for said drive head, an upper extension from said spherical member engaging said ball bearing, concaved seats for said spherical head, an outer casing enclosing said concaved seats, a stationary seal intermediate said outer casing and drive head, and gaskets intermediate said seal and drive head.

WALTER SCOTT MUMFORD.